(12) United States Patent
Yoshikawa et al.

(10) Patent No.: US 8,547,685 B2
(45) Date of Patent: Oct. 1, 2013

(54) TERMINAL BOX FOR SOLAR CELL MODULE

(75) Inventors: Hiroyuki Yoshikawa, Yokkaichi (JP);
Makoto Higashikozono, Yokkaichi (JP)

(73) Assignee: Kyocera Mita Corporation (JP)

( * ) Notice: Subject to any disclaimer, the term of this patent is extended or adjusted under 35 U.S.C. 154(b) by 74 days.

(21) Appl. No.: 12/993,996

(22) PCT Filed: Oct. 21, 2009

(86) PCT No.: PCT/JP2009/068096
§ 371 (c)(1),
(2), (4) Date: Sep. 13, 2011

(87) PCT Pub. No.: WO2010/137188
PCT Pub. Date: Dec. 2, 2010

(65) Prior Publication Data
US 2012/0057304 A1    Mar. 8, 2012

(30) Foreign Application Priority Data
May 27, 2009   (JP) .................................. 2009-128242

(51) Int. Cl.
*H05K 7/20* (2006.01)
*H01R 12/00* (2006.01)

(52) U.S. Cl.
USPC .......... 361/641; 361/658; 361/752; 439/76.1; 439/76.2

(58) Field of Classification Search
USPC ........................... 361/641, 658; 439/76.1, 76
See application file for complete search history.

(56) References Cited

U.S. PATENT DOCUMENTS

| 7,282,635 | B2 | 10/2007 | Utsunomiya et al. |
| 7,369,398 | B2* | 5/2008 | Higashikozono et al. ..... 361/641 |
| 7,723,609 | B2 | 5/2010 | Yoshikawa et al. |
| 7,920,385 | B2* | 4/2011 | Yoshikawa et al. ............ 361/752 |
| 8,366,471 | B2* | 2/2013 | Giefers .......................... 439/329 |
| 2009/0086444 | A1* | 4/2009 | Yoshikawa et al. ............ 361/752 |
| 2009/0227126 | A1* | 9/2009 | Yoshikawa et al. .......... 439/76.1 |
| 2010/0182761 | A1* | 7/2010 | Suzuki et al. .................. 361/807 |

FOREIGN PATENT DOCUMENTS

| JP | 11-251614 | 9/1999 |
| JP | 3498945 | 2/2004 |
| JP | 2005-19833 | 1/2005 |
| JP | 2006-13145 | 1/2006 |
| JP | 2006-165017 | 6/2006 |
| JP | 2006-286996 | 10/2006 |
| JP | 2007-311714 | 11/2007 |
| WO | 2007/052407 | 5/2007 |

* cited by examiner

*Primary Examiner* — Gregory Thompson
(74) *Attorney, Agent, or Firm* — Gerald E. Hespos; Michael J. Porco; Matthew T. Hespos (57) ABSTRACT

A terminal box is provided with a plurality of terminal plates (10) electrically connected to a solar cell module, bypass diodes (20) each electrically connected to two corresponding ones of the respective terminal plates (10), and a housing (31) having the respective terminal plates (10) and bypass diodes (20) arranged inside. The respective terminal plates (10) and bypass diodes (20) are mold-covered by a resin portion (30), whereby the housing (31) is integrally formed. The resin portion (30) of the housing (31) includes a thinner portion (15) deposited and having an outer shape in conformity with that of the bypass diodes (20).

10 Claims, 9 Drawing Sheets

TERMINAL BOX FOR SOLAR CELL MODULE

BACKGROUND OF THE INVENTION

1. Field of the Invention

The present invention relates to a terminal box for solar cell module.

2. Description of the Related Art

A solar cell panel constituting a solar power generation system is composed of a plurality of solar cell modules, and electrodes of the respective solar cell modules are connected in series or in parallel via terminal boxes.

A terminal box disclosed in Japanese Examined Patent Application Publication No. 3498945 includes a housing in the form of a shallow box, a pair of terminal plates laid on a bottom part in the housing and electrically connected to a solar cell module, and a bypass diode (rectifying element) at the time of a reverse load which diode is bridged between the both terminal plates. Leads of electrode portions of the solar cell module are connected by soldering to one end portions of the respective terminal plates through openings formed in the housing, and end portions of cables drawn out from the housing are connected by crimping to the other end portions of the terminal plates. Silicon resin is poured into the interior of the housing with the leads of the solar cell module and the end portions of the cables respectively connected to the both end portions of the terminal plates and the bottom surface of the housing bonded to the underside (underside when used) of the solar cell module, whereby connected parts are sealed around by the resin. Further, the housing is closed by a lid after the silicon resin is poured.

Since a diode reaches a very high temperature in exhibiting its function, it is required to release heat generated by the diode to the outside. However, in the above construction, a thick layer of the silicon resin having a low thermal conductivity is included in the housing, wherefore it is difficult to release the heat generated by the diode to the atmosphere via the silicon resin in the housing. Thus, the heat generated by the diode is mostly released to the solar cell module via the bottom part of the housing, with the result that the diode may be damaged without the heat being sufficiently released.

The present invention was developed in view of the above problems and an object thereof is to provide a terminal box for solar cell module having a good heat radiation property.

SUMMARY OF THE INVENTION

In order to accomplish the above object, the present invention is directed to a terminal box for solar cell module, comprising: a plurality of terminal plates electrically connected to a solar cell module, a bypass rectifying element at the time of a reverse load electrically connected to two corresponding ones of the respective terminal plates, a resin portion constituting a housing of the terminal box and mold-covering the respective terminal plates and the rectifying element, and a thinner portion formed in the resin portion and deposited on the rectifying element to have an outer shape in conformity with that of the rectifying element.

According to this, the rectifying element is mold-covered by the resin portion and this resin portion includes the thinner portion having the outer shape in conformity with that of the rectifying element. Thus, heat generated by the rectifying element is efficiently released toward the atmosphere via the thinner portion.

The terminal box may be constructed as follows.

The thinner portion may include a terminal surrounding portion deposited around the terminal plates and a diode surrounding portion deposited around the rectifying element, and the diode surrounding portion has a convex shape projecting more than the terminal surrounding portion. According to this, the positions of the rectifying element and the terminal plates can be discriminated.

The rectifying element may include a main body with a chip diode, and a connection pin drawn out from the main body to be connected to the terminal plate, the diode surrounding portion includes a first diode surrounding portion deposited around the main body and a second diode surrounding portion deposited around the terminal plate, and the second diode surrounding portion extends from a circumferential surface of the first diode surrounding portion. According to this, the positions of the main body and the connection pin can be discriminated.

The resin portion may include a primary resin layer deposited on the respective terminal plates and the rectifying element and a secondary resin layer arranged on an outer side of the primary resin layer, and the primary resin layer has higher heat resistance and a coefficient of expansion more approximate to that of the rectifying element than the secondary resin layer. By including such a primary resin layer, even if the rectifying element reaches a high temperature, such a situation can be coped with. In addition, a load which will act on the rectifying element from the primary resin layer due to a thermal expansion can be reduced. On the other hand, the secondary resin layer that does not strongly require such properties can be made of a more inexpensive material than the primary resin layer.

The primary resin layer may contain glass fibers, and the secondary resin layer contains no glass fibers. According to this, the primary resin layer can have good heat resistance against heat generated by the rectifying element and the secondary resin layer can avoid being subject to destruction or the like by an impact when this terminal box falls.

The primary resin layer preferably is made of polyphenylene sulfide, and the secondary resin layer is made of polyphenylene ether. Such materials are easily available.

An external connection cable drawn out to the outside from the housing preferably is connected to the terminal plate, and the secondary resin layer preferably is deposited around a connected part of the terminal plate and the cable. According to this, connection reliability of the terminal plate and the cable can be improved.

Heat radiation fins preferably are formed on an outer surface of the resin portion. According to this, heat can be more efficiently released toward the atmosphere.

An external connection cable drawn out to the outside from the housing preferably is connected to the terminal plate, a sealing member for sealing between the cable and the resin portion in a watertight manner is mounted on the cable and the resin portion, and the sealing member is so arranged as to seal an opening of a pin removal hole formed in the resin portion. The pin removal hole is left in the resin portion due to removal of a pin for supporting the cable at the time of molding the housing, and external matters such as water may enter this pin removal hole. However, according to this construction, the opening of the pin removal hole is sealed by the sealing member that seals between the cable and the resin portion, wherefore entrance of external matters into the pin removal hole is prevented. In this case, it is not necessary to seal the pin removal hole by separately applying potting or the like, wherefore operability can be improved and the construction can be simplified.

An adhesive preferably is interposed between an insulation coating of the cable and the resin portion surrounding around the insulation coating. According to this, formation of a clearance between the insulation coating and the resin portion can be avoided, for example, even if the cable becomes thinner due to long time use. Therefore, a predetermined sealing property can be maintained for long periods.

According to the present invention, a terminal box for solar cell module having a good heat radiation property can be provided since a heat radiation path toward the atmosphere is satisfactorily ensured in addition to a heat radiation path toward the solar cell module.

DETAILED DESCRIPTION OF THE PREFERRED EMBODIMENTS

A first embodiment of the present invention is described with reference to FIGS. 1 to 7. A terminal box for solar cell module of this embodiment is to be attached to the underside of an unillustrated solar cell module in which a multitude of solar cells connected in series to one another are arranged, and includes a plurality of terminal plates 10, bypass diodes 20 each bridged between two corresponding terminal plates 10 and a resin portion 30 covering the terminal plates 10 and the bypass diodes 20. The resin portion 30 is formed by a housing 31 which is an outer envelope of this box.

Each terminal plate 10 is formed to have a strip shape, for example, by cutting an electrically conductive metal plate, and four terminal plates 10 are arranged side by side in a width direction. An unillustrated lead of a solar cell group is connected to one end portion of each terminal plate 10.

Out of the respective terminal plates 10, two located at the opposite widthwise ends serve as cable connection terminals 10A each having a cable 60 for taking an electromotive force out from the solar cell group connected to the other end portion thereof. Here, each cable 60 is composed of a core 61 and an insulation coating 62 surrounding the core 61, the core 61 is exposed at an end portion of the cable 60 by stripping off the insulation coating 62, and a pair of barrel pieces 11 formed at the other end portion of the cable connection terminal 10A are crimped and connected to this exposed core 61. An intermediate portion of the cable connection terminal 10A is formed to be wider than the one and the other end portions and a connection hole 12, into which a main body portion 21 of the bypass diode 20 is to be fitted, is formed to penetrate this intermediate portion (see FIG. 3).

Out of the respective terminal plates 10, two located between the both cable connection terminals 10A serve as intermediate connection terminals 10L, 10R, wherein one intermediate connection terminal 10R (right one in the shown example) has the main body 21 of the bypass diode 20 supported thereon and the other intermediate connection terminal 10L (left one in the shown example) has no main body 21 supported thereon, but has the leading ends of connection pins 22 drawn out from the main bodies 21 supported on the terminal plates 10 at the opposite sides (cable connection terminal 10A and one intermediate connection terminal 10R) connected thereto, for example, by soldering.

Similar to the cable connection terminal 10A, a connection hole 12, into which the main body 21 is to be fitted, is formed to penetrate the one intermediate connection terminal 10R supporting the main body 21. Further, the one intermediate connection terminal 10R is cut to form a space portion 13 in the form of a slit in such a manner as to partition between the main body 21 and the connection pin 22. Heat generated by the bypass diode 20 is transferred by way of the space portion 13, thereby suppressing mutual thermal influence of the bypass diodes 20.

The one intermediate connection terminal 10R has a largest surface area among all the terminal plates 10 to enhance a heat radiation property also at the time of heat generation by the bypass diodes 20. In contrast, the other intermediate connection terminal 10L has a smallest surface area among all the terminal plates 10, thereby increasing the surface areas of the other terminal plates 10 instead to improve space saving.

Each bypass diode 20 is composed of the main body 21 in the form of a flat cylindrical block, and the bendable connection pin 22 drawn out from one end surface of the main body 21, and formed into a small package as a whole. The main body 21 is such that a lateral side of a chip diode composed of a P-side area (anode-side area) and an N-side area (cathode-side area) is surrounded by a metal cylinder. A bottom part (anode-side area or cathode-side area) of the chip diode is held in contact with a bottom part of the cylinder to be electrically connected thereto, whereas insulating resin is filled between the cylinder excluding the bottom part and the chip diode.

The connection pin 22 is bridged between the terminal plate 10 supporting the main body 21 and the terminal plate 10 (intermediate connection terminal 10L or 10R) adjacent to the former terminal plate 10, a base end side thereof is electrically connected to the ceiling surface (cathode-side area or anode-side area) of the chip diode and a leading end side thereof is electrically connected to the adjacent terminal plate 10.

In the case of this embodiment, the connection pin 22 of the bypass diode 20 bridged between the cable connection terminal 10A located at the left side in the shown example and the other intermediate connection terminal 10L has an N-polarity, the connection pin 22 of the bypass diode 20 bridged between the cable connection terminal 10A located at the right side in the shown example and the one intermediate connection terminal 10R has a P-polarity, and the connection pin 22 of the bypass diode 20 bridged between the one intermediate connection terminal 10R and the other intermediate connection terminal 10L has a P-polarity. Accordingly, each of the both cable connection terminals 10A can support the main body 21 of the bypass diode 20 by reversing a direction of a PN-junction of one of the respective bypass diodes 20 and auxiliarily providing the other intermediate connection terminal 10L.

The respective terminal plates 10 and bypass diodes 20 are mold covered by the resin portion 30, wherefore the housing 31 is integrally formed. Specifically, the resin portion 30 is in the form of a laterally long tube extending in a vertical direction and composed of a tubular portion 14, in which one end portion of each terminal plate 10 is located, and a thinner portion 15 integral to and continuous with the other end of the tubular portion 14 and in the form of a thin layer deposited on the respective terminal plates 10, the bypass diodes 20 and the end portions of the cables 60 (see FIGS. 1 and 2).

The tubular portion 14 includes a laterally long opening 16, a plurality of leads corresponding to the solar cell groups are introduced into the opening 16 from a bottom side, and the respective introduced leads are connected to the one end portions of the corresponding terminal plates 10, for example, by soldering. An insulating resin material (potting material) is poured into the opening 16 of the tubular portion 14, and an unillustrated cover is mounted after the insulating resin material is poured.

The thinner portion 15 includes a terminal surrounding portion 17 in the form of a thin layer deposited around the terminal plates 10, diode surrounding portions 18 in the form of thin layers deposited around the bypass diodes 20 and cable surrounding portions 19 in the form of thin layers deposited around the end portions of the cables 60. The terminal surrounding portion 17 has a substantially flat shape extending along both the top surfaces and the undersides of the terminal plates 10. On the other hand, the diode surrounding portions 18 and the cable surrounding portions 19 have convex shapes projecting more upward than the terminal surrounding portion 17.

Each cable surrounding portion 19 is formed to have a cylindrical shape surrounding the end portion of the cable 60 including the barrel pieces 11 after being widened toward the end of the cable 60, and a pair of projections 19A of the cable surrounding portions 19 project in a draw-out direction of the cable 60 from the other end of the housing 31. A stepped interlocking portion 9, with which a sealing member 80 is to be engaged, is circumferentially formed in the outer circumferential surface of the projection 19A, and a pin removal hole 8 is formed at a side of the projection 19A more toward the projecting end than the interlocking portion 9 upon removing a pin supporting the cable 60 at the time of molding the housing 31. The sealing member 80 is made of rubber such as silicon rubber and mounted on both the projection 19A of the cable surrounding portion 19 and the end portion of the cable 60, and has a stepped locking portion 81 corresponding to the interlocking portion 9 circumferentially formed on the inner circumferential surface thereof (see FIG. 7).

Each diode surrounding portion 18 has an outer shape in conformity with that of the bypass diode 20, and is composed of a first diode surrounding portion 18A extending along the circumferential surface and ceiling surface of the main body 21 of the bypass diode 20 and a second diode surrounding portion 18B extending along the circumferential surface and end surfaces of the connection pin 22 of the bypass diode 20. The first diode surrounding portion 18A has a cylindrical shape standing up from the terminal surrounding portion 17, and the second diode surrounding portion 18B has a narrow and long cylindrical shape extending along the top surface of the terminal surrounding portion 17. The second diode surrounding portion 18B extends straight in the width direction from the circumferential surface of the first diode surrounding portion 18A. The upper surface of the second diode surrounding portion 18B is arranged at a position higher than that of the first diode surrounding portion 18A. One end of each of the first diode surrounding portions 18A located at the opposite widthwise ends is cut and joined with the other end of the tubular portion 14, and the other end thereof is joined with one end of the cable surrounding portion 19.

The resin portion 30 is composed of a primary resin layer 34 deposited on the terminal plates 10 (excluding the lead and a connected part to the cable 60 for each cable connection terminal 10A) and the bypass diodes 20, and a secondary resin layer 35 placed on the outer side of the primary resin layer 34, deposited on the connected parts of the cable connection terminals 10A and the cables 60 and including a surface which specifies an appearance configuration of the housing 31. These layers 34, 35 are made of different resin materials. The primary resin layer 34 is thinner than the secondary resin layer 35, and both the primary resin layer 34 and the secondary resin layer 35 have outer shapes in conformity with those of the respective terminal plates 10 and bypass diodes 20. When the surface shape of the secondary resin layer 35 is seen, the positions of the bypass diodes 20 and the like can be confirmed.

The primary resin layer 34 is made of thermoplastic resin having good heat resistance such as polyphenylene sulfide (hereinafter, called "PPS"), and higher heat resistance is exhibited by containing glass fibers. In contrast, the secondary resin layer 35 is made of thermoplastic resin having good weather resistance and mechanical property such as polyphenylene ether (hereinafter, called "PPE"), and no glass fibers are contained therein. The PPS constituting the primary resin layer 34 has a coefficient of linear expansion lower and more approximate to that of metal such as copper alloy constituting the respective terminal plates 10 and the connection pins 22 of the bypass diodes 20 than that of the PPE constituting the secondary resin layer 35.

Next, a method for producing the terminal box for solar cell module according to this embodiment and a method for mounting the terminal box on the solar cell module are described.

Upon producing the terminal box, chained terminal plates 10 in which the respective terminal plates 10 are integrally connected via carriers 6 are first prepared. A plurality of carriers 6 are bridged between the facing opposite edges of the respective terminal plates 10. Subsequently, the main bodies 21 of the bypass diodes 20 are press-fitted into the respective connection holes 12 of the both cable connection terminals 10A and the one intermediate connection terminal 10R and the leading ends of the connection pins 22 are placed on the top surfaces of the adjacent terminal plates 10 (intermediate connection terminals 10L, 10R) adjacent to these terminals and are connected by resistance welding, soldering or the like. At this time, since displacements of the terminal plates 10 relative to each other are hindered by the carriers 6, exertion of an excessive stress on the connected parts of the connection pins 22 and the terminal plates 10 can be avoided.

Figure 1:
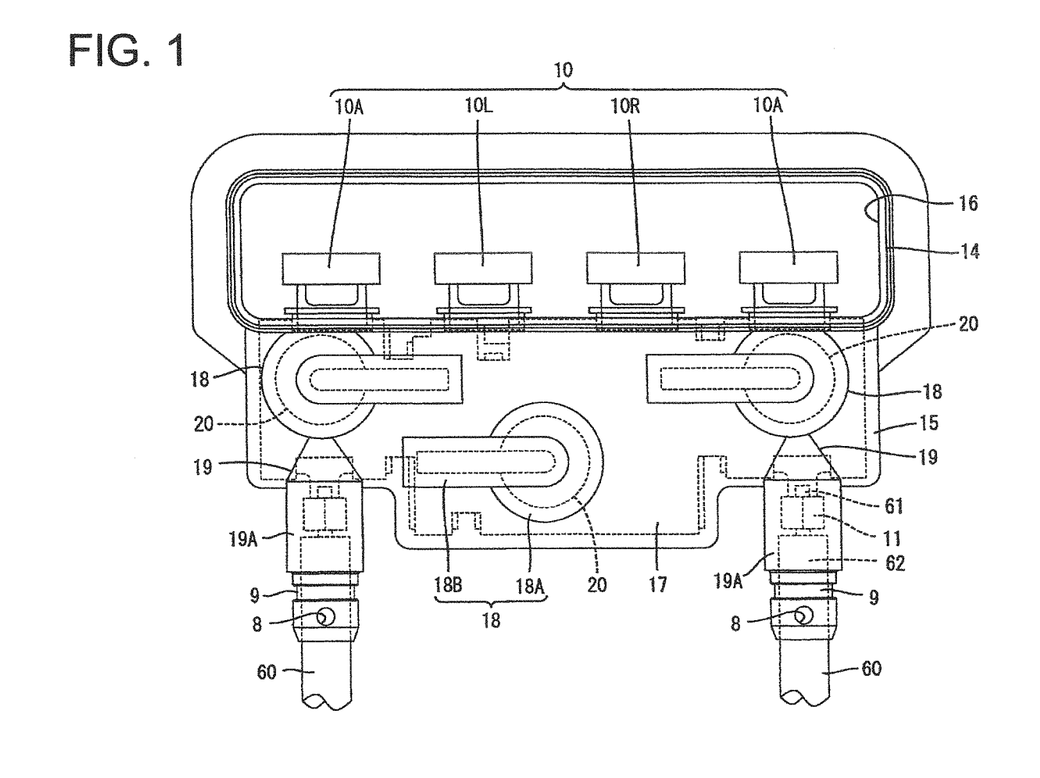
FIG. 1 is a plan view of a terminal box for solar cell module according to a first embodiment.
Figure 2:
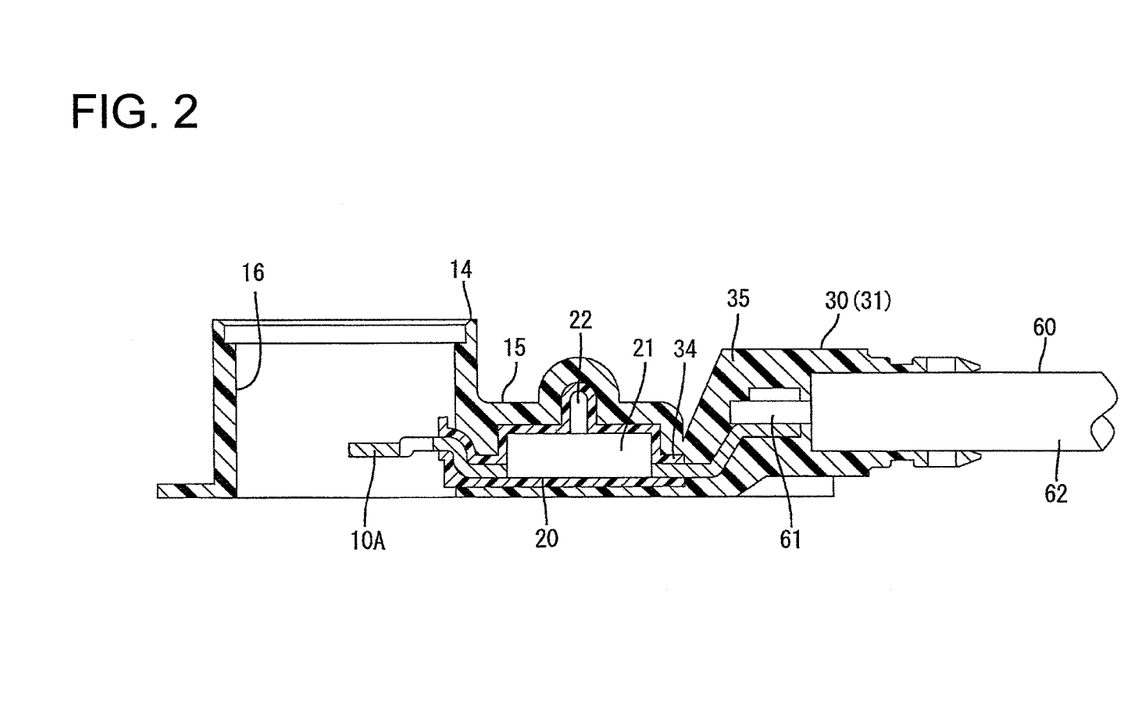
FIG. 2 is a section of the terminal box.
Figure 3:
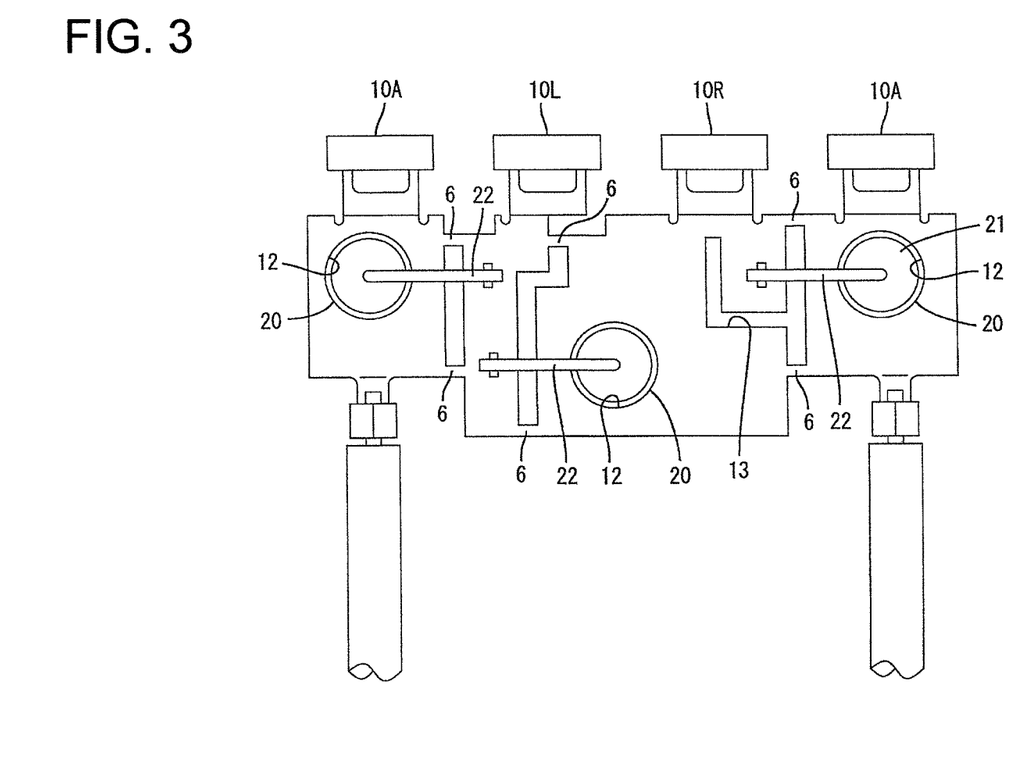
FIG. 3 is a plan view of a chained terminal unit.
Figure 4:
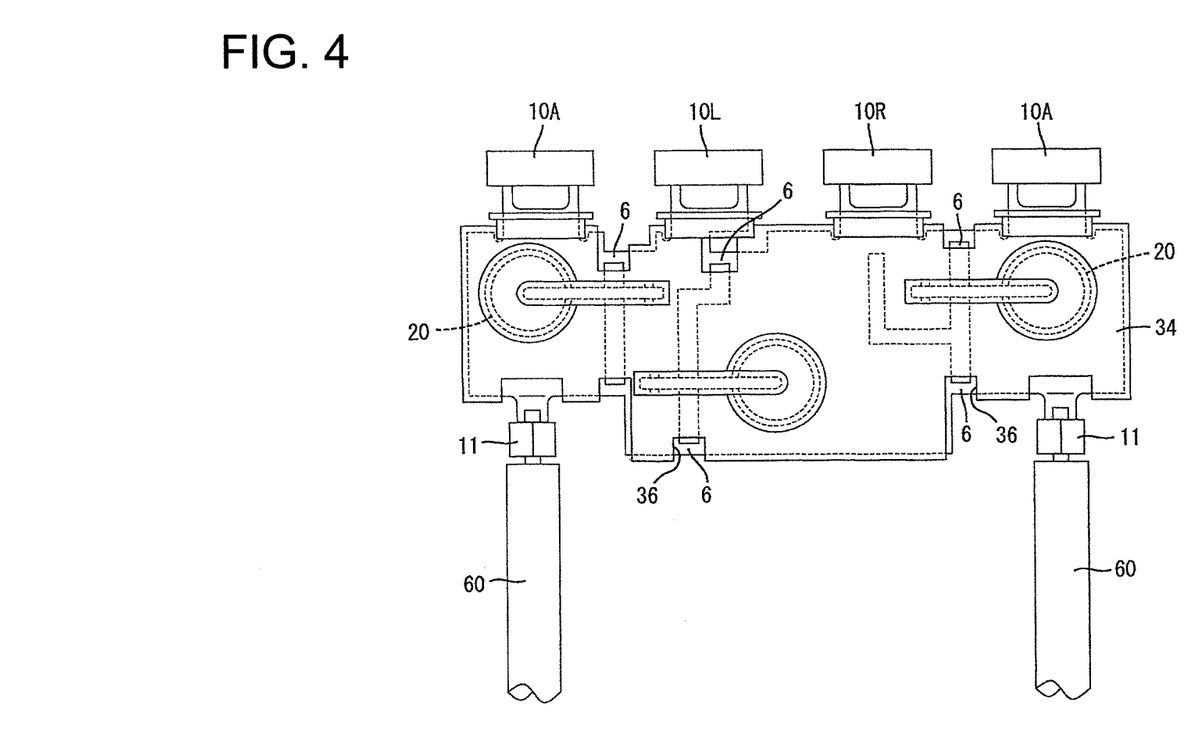
FIG. 4 is a plan view of a primary molded unit.
Figure 5:
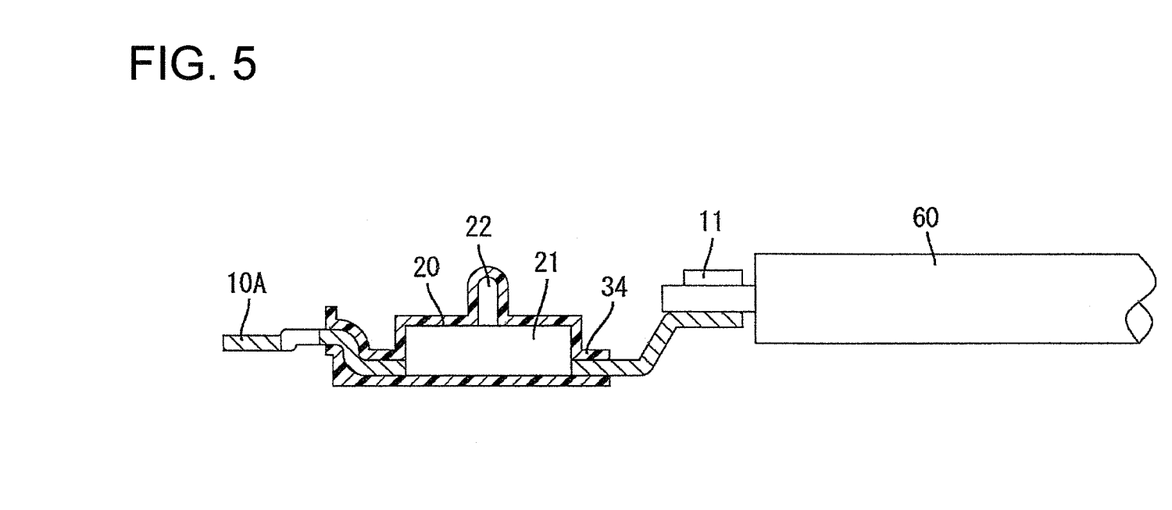
FIG. 5 is a section of the primary molded unit.
Figure 6:
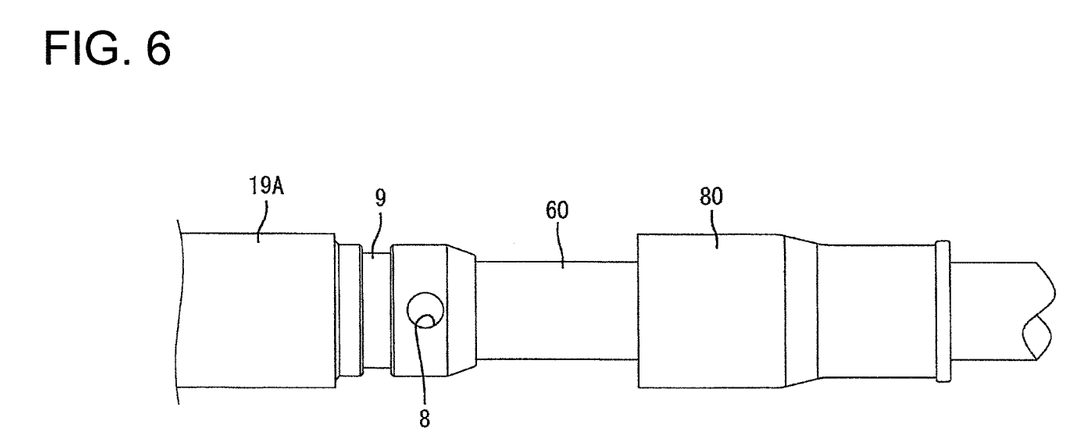
FIG. 6 is a plan view of a cable surrounding portion before a sealing member is mounted.

Subsequently, the cores 61 of the end portions of the cables 60 are placed on the other end portions of the cable connection terminals 10A, the barrel pieces 11 are crimped and connected to the cores 61 in this state, and the cable connection terminals 10A are connected to the end portions of the cables 60 (see FIG. 3). Note that the sealing members 80 are mounted on the outer circumferential surfaces of the cables 60 in advance prior to connection to the cable connection terminals 10A (see FIG. 6).

Subsequently, the above chained terminal unit is set in an unillustrated mold for primary molding and resin is filled into this mold. Then, the intermediate portions of the respective terminal plates 10 excluding the carriers 6 and the rectifying elements are covered by a thin layer of the resin, thereby forming the primary resin layer 34 (see FIGS. 4 and 5). At this time, cutouts 36 for exposing the carriers 6 are formed to have three open sides in parts corresponding to the carriers 6.

Subsequently, the carriers 6 are cut and removed through the cutouts 36, thereby separating the respective terminal plates 10 from each other. After removing the carriers 6, displacements of the terminal plates 10 relative to each other are hindered by the primary resin layer 34.

Subsequently, the above primary molded unit is set in an unillustrated mold for secondary molding and resin is filled into this mold. Then, the secondary resin layer 35 is deposited on the outer side of the primary resin layer 34 to form the thinner portion 15, and the tubular portion 14 is formed on one end of the thinner portion 15, whereby the housing 30 is integrally formed (see FIGS. 1 and 2). At this time, the resin of the secondary resin layer 35 also covers the cutouts 36, which then disappear. The cables 60 can be positioned and supported at specified height positions by being pressed from both above and below by unillustrated pins at the time of such secondary molding, whereas the pin removal holes 8 are left in the projections 19A of the cable surrounding portions 19 by removing the pins. Note that an adhesive is applied to the outer circumferential surfaces of the end portions of the cables 60 prior to secondary molding and the end portions of the cables 60 and the secondary resin layer 35 are closely bonded via the adhesive after secondary molding.

Figure 7:
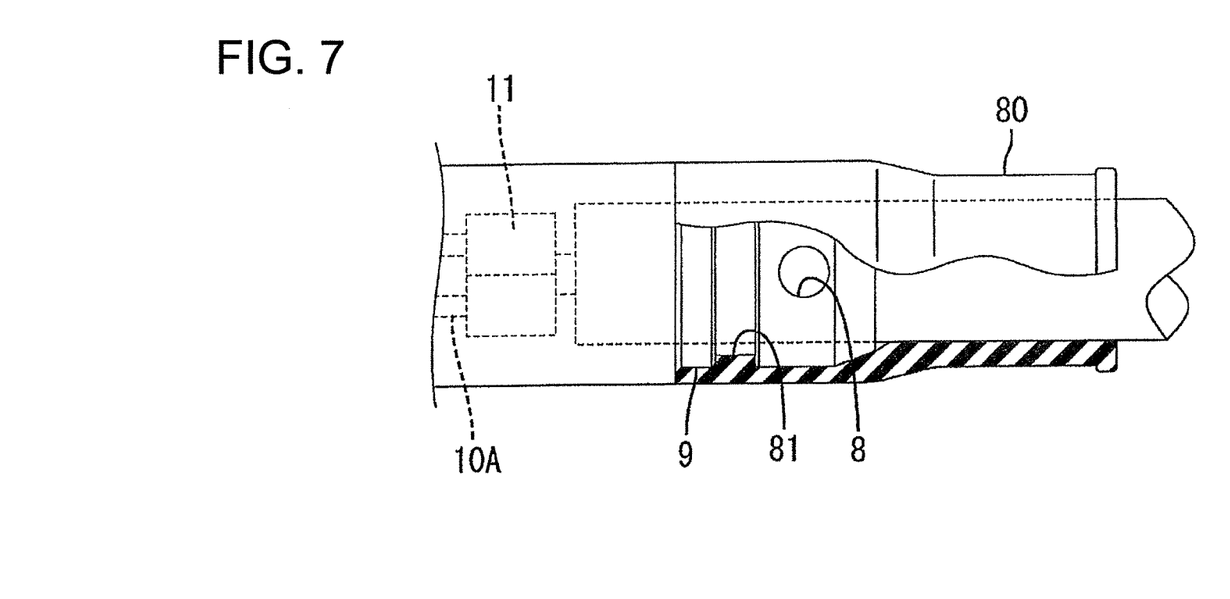
FIG. 7 is a plan view partly in section of the cable surrounding portion having the sealing member mounted thereon.

Subsequently, the sealing members 80 are pulled up toward the cable connection terminals 10A and retained and mounted on the resin portion 30 by the engagement of the locking portions 81 and the interlocking portions 9 (see FIG. 7). This prevents water penetration to clearances between the cable surrounding portions 19 and the end portions of the cables 60 to provide sealing in the resin portion 30. Further, when the sealing members 80 are mounted on the resin portion 30, the openings of the pin removal holes 8 are sealed by the sealing members 80.

Thereafter, the bottom surface of the housing 31 is mounted on the solar cell module by an adhesive or the like. In the mounting process, the leads are pulled into the opening 16 of the tubular portion 14 and the leading ends of the leads are soldered to the one end portions of the corresponding terminal plates 10. Subsequently, insulating resin such as silicon resin is filled into the opening 16 and a cover is mounted on the opening 16. In this way, the mounting of the terminal box on the solar cell module is completed.

Since the bypass diodes 20 reach very high temperatures when used, they may be damaged by heat of their own and their rectifying function may be disrupted. In this respect, according to this embodiment, heat generated by the bypass diodes 20 is satisfactorily released from the bottom surface of the thinner portion 15 toward the solar cell module and from the ceiling surface of the thinner portion 15 toward the atmosphere, wherefore a heat radiation property is good.

Further, since the primary resin layer 34 is made of the PPS having higher heat resistance than the secondary resin layer 35, even if the bypass diodes 20 reach high temperatures, such a state can be coped with. In addition, since the primary resin layer 34 has a coefficient of expansion more approximate to that of the bypass diodes 20 than the secondary resin layer 35, it can be avoided that loads acting on the connection pins 22 of the bypass diodes 20 become excessive due to thermal expansions of the primary resin layer 34 and the bypass diodes 20. On the other hand, the secondary resin layer 35 that does not strongly require such properties can be made of the PPE and the PPE provides good weather resistance, wherefore the secondary resin layer 35 can bear exposure and use outdoors.

Since the primary resin layer 34 contains the glass fibers, it has good heat resistance against heat generated by the bypass diodes 20. In contrast, since the secondary resin layer 35 contains no glass fibers, the box can avoid being subject to destruction or the like by an impact at the time of a fall.

Further, since the openings of the pin removal holes 8 are sealed by the sealing members 80 that seal between the cables 60 and the resin portion 30 after the housing 30 is molded, entrance of external matters into the pin removal holes 8 can be prevented. In this case, since it is not necessary to seal the pin removal holes 8 by separately applying potting or the like, operability can be improved and the construction can be simplified.

Furthermore, since the adhesive is interposed between the insulation coatings of the cables 60 and the resin portion 30, formation of clearances between the insulation coatings and the resin portion 30 can be avoided, for example, even if the cables 60 become thinner due to long time use, wherefore a predetermined sealing property can be maintained for long periods.

Figure 8:
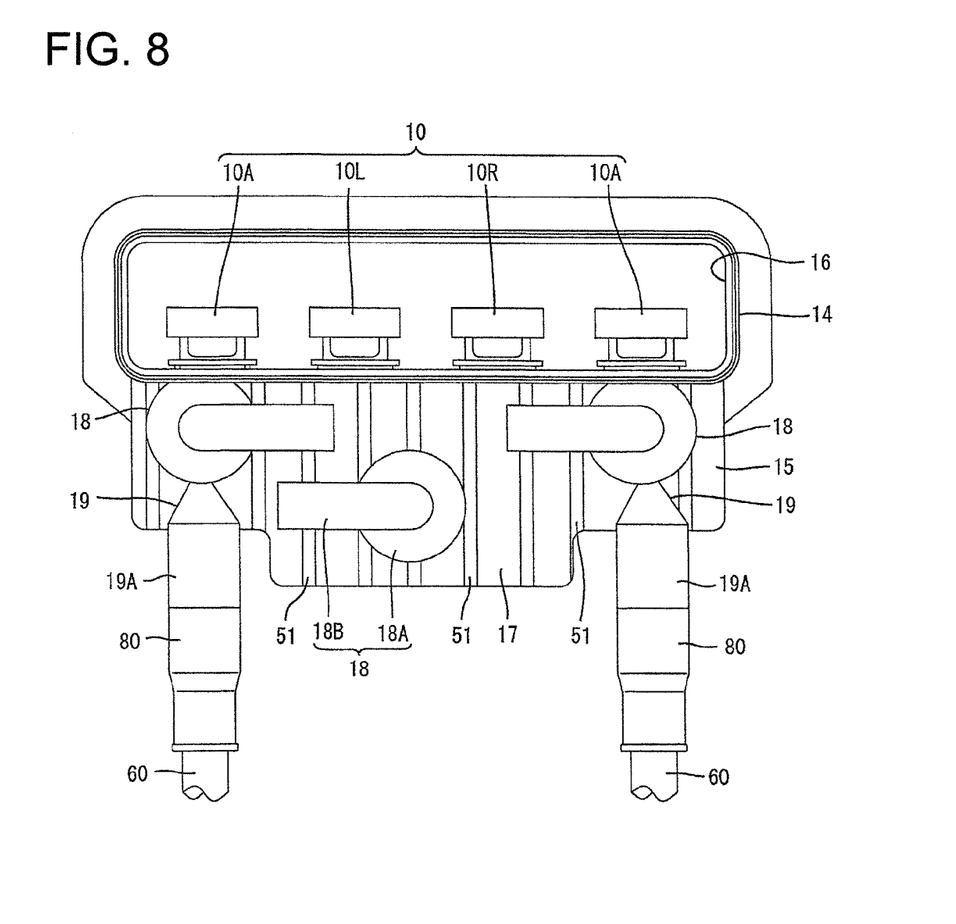
FIG. 8 is a plan view of a terminal box for solar cell module according to a second embodiment.
Figure 9:
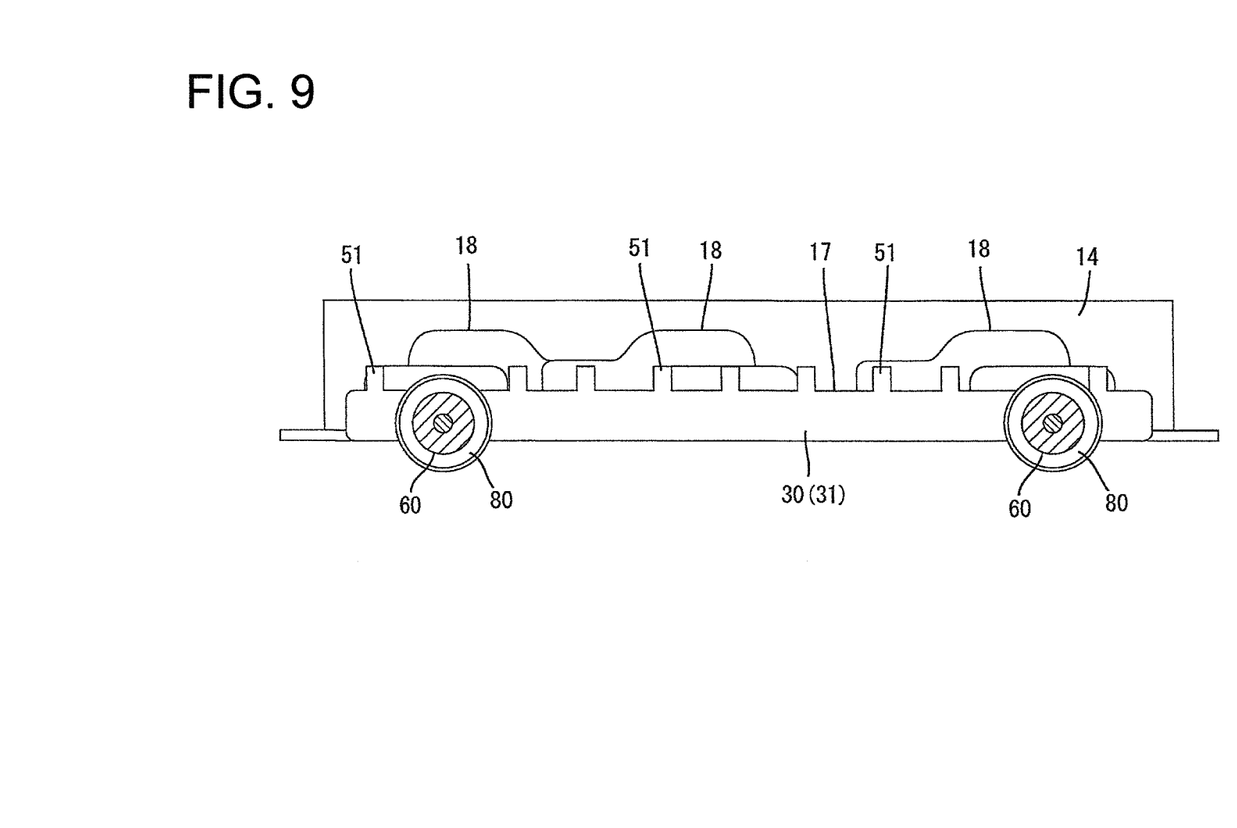
FIG. 9 is a rear view of the terminal box.

FIGS. 8 and 9 show a second embodiment of the present invention. In the second embodiment, a multitude of heat radiation fins 51 are integrally formed on a surface of a thinner portion 15. The other construction is similar to the first embodiment and the construction similar to the first embodiment is identified by the same reference numerals and not repeatedly described.

The respective multitude of fins 51 are in the form of narrow and long ribs extending in a direction parallel to a draw-out direction of cables 60 and arranged at substantially regular intervals, and form a vertical stripe pattern as a whole. Further, the respective fins 51 are formed only on a terminal surrounding portion 17, but neither on diode surrounding portions 18 nor on cable surrounding portions 19, and intersect with and are connected to the outer peripheries of the diode surrounding portions 18 and the cable surrounding portions 19. According to the second embodiment, a heat radiation property toward the atmosphere is further improved by the heat radiation fins 51.

The present invention is not limited to the embodiments described above and illustrated in the drawings. For example, the following modes are also included in the technical scope of the present invention.

The primary resin layer may be made of thermosetting resin such as epoxy resin or unsaturated polyester resin instead of the PPS.

In the second embodiment, the fins may also be formed on the diode surrounding portions or the cable surrounding portions.

The sealing members may be omitted. In this case, primer or the like may be provided between the insulation coatings of the cables and the resin portion surrounding them.

The bypass diodes are not limited to the package diodes as described above and bare chip diodes or the like may be used.

The terminal plates may include only two cable connection terminals and only one bypass diode may be formed to bridge between the two cable connection terminals.

The thinner portion may have a single layer structure by omitting the secondary resin layer.

The thinner portion may be formed only around the bypass diodes.

What is claimed is:

1. A terminal box for solar cell module, comprising:
a plurality of terminal plates electrically connected to a solar cell module,
a bypass rectifying element at the time of a reverse load electrically connected to two corresponding ones of the respective terminal plates,
a resin portion constituting a housing of the terminal box and mold-covering the respective terminal plates and the rectifying element, and
a thinner portion formed in the resin portion and deposited on the rectifying element to have an outer shape in conformity with that of the rectifying element.

2. The terminal box of claim 1, wherein:
the thinner portion includes a terminal surrounding portion deposited around the terminal plates and a diode surrounding portion deposited around the rectifying element, and
the diode surrounding portion has a convex shape projecting more than the terminal surrounding portion.

3. The terminal box of claim 2, wherein:
the rectifying element includes a main body with a chip diode, and a connection pin drawn out from the main body to be connected to one of the terminal plates,
the diode surrounding portion includes a first diode surrounding portion deposited around the main body and a second diode surrounding portion deposited around the connection pin, and
the second diode surrounding portion extends from a circumferential surface of the first diode surrounding portion.

4. The terminal box according to claim 1, wherein:
the resin portion includes a primary resin layer deposited on the respective terminal plates and the rectifying element and a secondary resin layer arranged on an outer side of the primary resin layer, and
the primary resin layer has higher heat resistance and a coefficient of expansion more approximate to that of the rectifying element than the secondary resin layer.

5. The terminal box of claim 4, wherein:
the primary resin layer contains glass fibers, and
the secondary resin layer contains no glass fibers.

6. The terminal box of claim 5, wherein:
the primary resin layer is made of polyphenylene sulfide, and
the secondary resin layer is made of polyphenylene ether.

7. The terminal box of claim 4, wherein:
an external connection cable drawn out to the outside from the housing is connected to one of the terminal plates to define a connected part, and
the secondary resin layer is deposited around the connected part of the terminal plate and the cable.

8. The terminal box of claim 1, wherein heat radiation fins are formed on an outer surface of the resin portion.

9. The terminal box of claim 1, wherein:
an external connection cable drawn out to the outside from the housing is connected to one of the terminal plates,
a sealing member for sealing between the cable and the resin portion in a watertight manner is mounted on the cable and the resin portion, and
the sealing member is so arranged as to seal an opening of a pin removal hole formed in the resin portion.

10. The terminal box of claim 9, wherein an adhesive is interposed between an insulation coating of the cable and the resin portion surrounding around the insulation coating.

* * * * *